United States Patent [19]

Ryu

[11] 4,400,015
[45] Aug. 23, 1983

[54] RETRACTORS EMBEDDED IN SIDE FRAME MEMBERS OF CARS

[75] Inventor: Nobuyuki Ryu, Toyota, Japan

[73] Assignee: Toyota Jidosha Kogyo Kabushiki Kaisha, Toyota, Japan

[21] Appl. No.: 270,010

[22] Filed: Jun. 3, 1981

[30] Foreign Application Priority Data

Jul. 29, 1980 [JP] Japan .................. 55-107279[U]

[51] Int. Cl.³ ............................................. B60R 21/10
[52] U.S. Cl. .................................. 280/807; 297/475; 297/481
[58] Field of Search ............... 280/801, 807; 297/475, 297/474, 481

[56] References Cited

U.S. PATENT DOCUMENTS 3,291,526  12/1966  Nicholas .......................... 280/807
3,414,291  12/1968  Jantzen ........................... 280/807

Primary Examiner—Robert R. Song
Attorney, Agent, or Firm—Parkhurst & Oliff

[57] ABSTRACT

Substantial portions of seat belt retractors are embedded in side frame members of a car, so that their upper parts extend upward to a smaller height and occupy a smaller space in a space above the seat or floor of the car to prevent the seat belt retractors from obstructing or giving an uncomfortable feeling to persons getting in or out of the car or sitting on the seat.

6 Claims, 2 Drawing Figures

RETRACTORS EMBEDDED IN SIDE FRAME MEMBERS OF CARS

BACKGROUND OF THE INVENTION

The present invention relates to seat-belt retractors for vehicles and, more particularly, to such seat-belt retractors to be provided to rear seats of passenger cars.

In existing passenger cars, especially, in those cars manufactured for export to U.S.A., seat belts of their rear seats generally comprise mere waist belts that are anchored at two points to their bodies through retractors having emergency locking devices, and these retractors are secured onto top surfaces of car floor members, with boot members of the retractors projecting upwards to substantial height in spaces over the rear seats. Thus, these retractors or their boot members inevitably constitute obstacles to persons getting in or out of the cars or to maintenance works.

SUMMARY OF THE INVENTION

The present invention has been achieved with a view to overcoming the aforementioned drawbacks of the prior art seat-belt retractors.

Accordingly, an object of the present invention is to provide an improved arrangement of seat-belt retractors that neither obstruct persons getting in or out of the rear seats of cars or carrying out maintenance works nor give uncomfortable feeling to the occupants of the rear seats.

According to the present invention, the aforementioned object can be achieved by embedding the retractors in the right-hand and left-hand side frame members under a floor of a car, respectively, so that the retractors do not occupy any substantial spaces above the rear seat.

These and other objects and features will become more apparent from the following description of the preferred embodiments of the present invention when read in connection with the accompanying drawings.

DETAILED DESCRIPTION OF THE PREFERRED EMBODIMENTS

Figure 1:
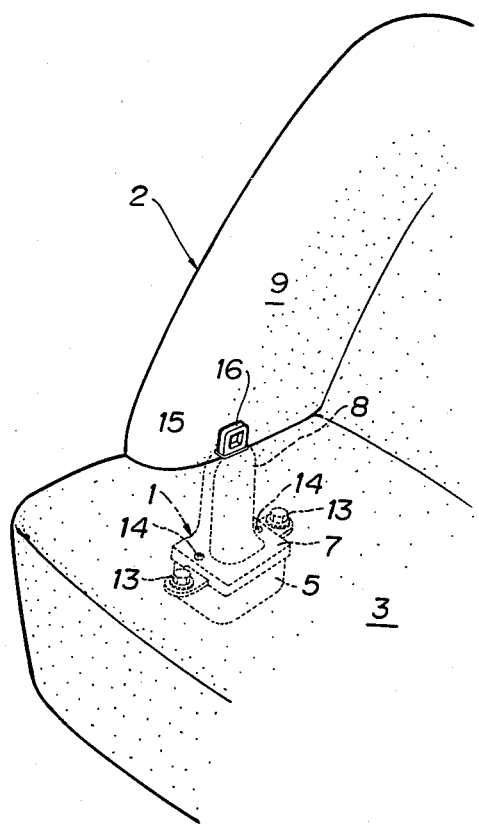
FIG. 1 is a perspective of a seat-belt retractor which is disposed, according to the present invention, at a right-hand end portion of a rear seat.
Figure 2:
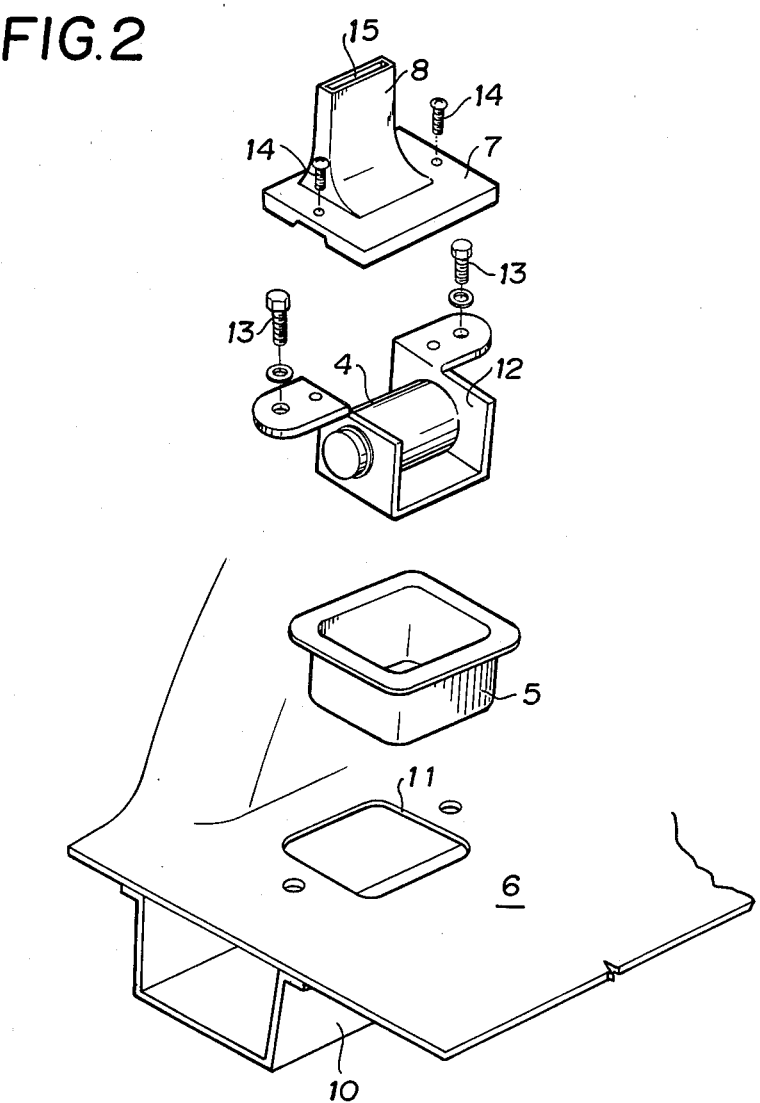
FIG. 2 is a perspective of the seat-belt retractor of FIG. 1 showing its assembling and installation procedures.

Referring to FIG. 1 of the accompanying drawings, seat-belt retractors 1 are provided one on each side of the rear seat 2. However, for simplicity of illustration, only one of them to be disposed on the right-hand end of the rear seat is shown on the drawings. As shown in FIG. 2, the retractor 1 comprises a retractor body 4, a casing 5 for housing the retractor body 4 and a cover 7 having a boot member 8 formed with a belt outlet 15 at its top end. The casing 5 is disposed on the underside of a floor 6 of the car, while the cover 7 is disposed on the topside of the floor 6 with its boot member extending upward so that the belt outlet 15 is opened at a position between the rightmost end of a seat cushion 3 and a seat-back side 9.

Also, as shown in FIG. 2 in detail, a retractor embedding hole 11 is cut in the floor 6 at its portion coming just above a side frame member 10 (only right-hand one is shown in FIG. 2) of the car. The casing 5 is embedded in the side frame member 11 by being fitted into the hole 11 and suspended from the floor 6. The casing 5 houses the retractor body 4 which is rotatably supported by a frame 12. The casing 5 is secured to the floor 6 with bolts 13. Thus, the retractor body 4 is housed in the side frame member 10 under the floor 6. The cover 7 on the casing 5 is secured to the frame 12 with screws 14. The boot member 8 of the cover 7 extends upward and guides the seat belt would up on the retractor body 4. The belt outlet 15 at the top end of the boot member 8 has a slit-like configuration, and is disposed between the side end of the seat cushion 3 and the seat-back side 9 as described previously. Thus, a tongue plate connected to the seat belt is protractably held in the belt outlet 15 so that it extends upward to a slightly above the top surface of the seat cushion 3 at that position between the side end of the seat cushion 3 and the seat-back side 9.

As described hereinbefore, since the retractors 1 have their bodies 4 embedded in the side frame members 10 almost directly under the opposite ends of the seat cushion 3 with only their boot members 8 extending upward in the proximity of these opposite ends of the seat cushion 3, persons sitting on the rear seat do not contact the retractors 1 with an uncomfortable feeling regardless of the position on the rear seat they occupies. Also, since the retractors are embedded in the side frame members 10 merely by cutting the holes 11 in the floor 6 without working the side frame members at all, the frame members are not adversely affected at all in their strength. Further, the cover 7 closing the casing 5 isolates the retractor body 4 from the exterior to provide it with a water resistance, heat resistance and dust-proofness.

What is claimed is:

1. An arrangement of a seat belt retractor in a car comprising:

right and left frame members, said frame members comprising a part of the car body;

a floor member disposed above said frame members and having at least one retractor embedding hole therein;

at least one seat belt retractor fitted into said embedding hole and located beneath the floor member, the retractor having (i) a webbing mechanism therein for winding up and unwinding a seat belt webbing, (ii) a mechanism frame for supporting a webbing mechanism, and (iii) a cover for covering the webbing mechanism, the cover being provided with a belt outlet therein for a seat belt webbing to pass through during winding up and unwinding;

wherein the retractor cover is detachably secured to the mechanism frame by a first securing means, and the mechanism frame is secured to the floor member by a second securing means, such that the mechanism frame can be separated from the floor member without the retractor cover becoming detached from the mechanism frame.

2. The seat belt retractor arrangement of claim 1 wherein there is provided at least two seat belt retractors and at least two embedding holes, each of the belt outlets of two of said belt retractors being disposed and opened in the proximity of one of the opposite side ends of a seat cushion of the car.

3. The seat belt retractor arrangement of claim 2, wherein each of the two seat belt retractors is mounted directly under the car seat.

4. The seat belt retractor arrangement according to claim 7, wherein each said seat belt retractor further has a casing provided with a flange around the periphery of a top opening thereof and said casing is embedded in each said side frame member by being supported at said flange thereof onto the periphery of each said hole in the floor member.

5. The seat belt retractor arrangement according to claim 7, wherein the second securing means comprises a flange provided on the mechanism frame which is bolted to the floor member to secure the seat belt retractor to the floor member.

6. The seat belt retractor arrangement according to claim 2, wherein each side frame member comprises a channel frame.

* * * * *